United States Patent
Vidas et al.

(10) Patent No.: US 10,735,470 B2
(45) Date of Patent: Aug. 4, 2020

(54) SYSTEMS AND METHODS FOR SHARING, DISTRIBUTING, OR ACCESSING SECURITY DATA AND/OR SECURITY APPLICATIONS, MODELS, OR ANALYTICS

(71) Applicant: SECUREWORKS CORP., Wilmington, DE (US)

(72) Inventors: Timothy Vidas, Omaha, NE (US); Jon Ramsey, Atlanta, GA (US); Aaron Hackworth, Johns Creek, GA (US); Robert Danford, Boulder, CO (US); William Urbanski, Whitefish, MT (US)

(73) Assignee: SECUREWORKS CORP., Wilmington, DE (US)

( * ) Notice: Subject to any disclaimer, the term of this patent is extended or adjusted under 35 U.S.C. 154(b) by 0 days.

(21) Appl. No.: 15/804,109

(22) Filed: Nov. 6, 2017

(65) Prior Publication Data

US 2019/0141079 A1    May 9, 2019

(51) Int. Cl.
*H04L 29/06* (2006.01)
*G06N 7/00* (2006.01)
(Continued)

(52) U.S. Cl.
CPC .............. *H04L 63/20* (2013.01); *G06F 21/52* (2013.01); *G06F 21/6218* (2013.01); *G06N 3/08* (2013.01); *G06N 7/005* (2013.01); *H04L 63/0227* (2013.01)

(58) Field of Classification Search
CPC ..... H04L 63/20; H04L 63/0227; G06F 21/52; G06F 21/6218; G06N 7/005; G06N 3/08; G06N 3/02; G06N 20/00
See application file for complete search history.

(56) References Cited

U.S. PATENT DOCUMENTS 5,937,066 A    8/1999   Gennaro
6,357,010 B1   3/2002   Viets et al.
(Continued)

FOREIGN PATENT DOCUMENTS

WO   WO2007002749 A2   1/2007
WO   WO2007090605 A1   8/2007
WO   WO2010059843 A2   5/2010

OTHER PUBLICATIONS

Secureworks—Log Management—Protect your infrastructure from known and emerging threats; www.secureworks.com/resources/ds-log-management; 2015 (available).
(Continued)

*Primary Examiner* — Chau Le
*Assistant Examiner* — Han Yang
(74) *Attorney, Agent, or Firm* — Womble Bond Dickinson (US) LLP

(57) ABSTRACT

Methods and systems for developing and distributing applications and data for building security applications can be provided. A plurality of data policies can be set for access and/or filtering security data based on selected parameters. One or more modules can be generated for processing the security data, with each of the modules governed by one or more module policies. Upon receipt of a request to initiate execution of the one or more modules to access and process a selected portion or filtered set of the security data, it can be determined if the request violates the data policies and/or the module policies applicable for processing the selected portion or filtered set of the security data, and if the data policies and/or the module policies are not violated, the one or more modules can be executed to process the selected portion or filtered set of the security data.

18 Claims, 11 Drawing Sheets

(51) Int. Cl.
*G06N 3/08* (2006.01)
*G06F 21/52* (2013.01)
*G06F 21/62* (2013.01)

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 * | 12/2012 | Korablev ............ G06F 21/6218 707/728 |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,137,262 B2 | 9/2015 | Qureshi |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury |
| 9,548,994 B2 * | 1/2017 | Pearcy ................ G06F 21/577 |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Benerjee et al. |
| 9,667,661 B2 | 5/2017 | Sharma et al. |
| 9,710,672 B2 | 7/2017 | Braun |
| 9,742,559 B2 | 8/2017 | Christodorescu |
| 9,767,302 B2 | 9/2017 | Lim |
| 9,805,202 B2 | 10/2017 | Medeiros et al. |
| 9,973,524 B2 | 5/2018 | Boyer |
| 10,050,992 B2 | 8/2018 | Thyni |
| 10,116,500 B1 | 10/2018 | Long |
| 10,311,231 B1 | 6/2019 | Kayyoor |
| 10,382,489 B2 | 8/2019 | Das |
| 10,425,223 B2 | 9/2019 | Roth |
| 10,474,820 B2 | 11/2019 | Manadhata |
| 2002/0129135 A1 | 9/2002 | Delany et al. |
| 2005/0138204 A1 | 6/2005 | Iyer et al. |
| 2005/0288939 A1 | 12/2005 | Peled et al. |
| 2006/0012815 A1 | 1/2006 | Ebner |
| 2006/0037076 A1 | 2/2006 | Roy |
| 2006/0195575 A1 | 8/2006 | Delany et al. |
| 2006/0253447 A1 | 11/2006 | Judge |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos |
| 2008/0255997 A1 | 10/2008 | Bluhm |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2011/0004771 A1 | 1/2011 | Matsushima |
| 2011/0179492 A1 | 7/2011 | Markopoulou |
| 2011/0276604 A1 | 11/2011 | Hom et al. |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0260341 A1 | 10/2012 | Chan et al. |
| 2013/0104191 A1 | 4/2013 | Peled et al. |
| 2013/0173620 A1 | 7/2013 | Takenouchi |
| 2013/0226938 A1 | 8/2013 | Risher et al. |
| 2013/0282746 A1 | 10/2013 | Balko |
| 2013/0291103 A1 | 10/2013 | Davenport et al. |
| 2013/0318604 A1 | 11/2013 | Coates et al. |
| 2014/0041028 A1 | 1/2014 | Ramsey et al. |
| 2014/0051432 A1 | 2/2014 | Gupta |
| 2014/0222712 A1 | 8/2014 | Samaha |
| 2014/0373151 A1 | 12/2014 | Webb et al. |
| 2015/0019323 A1 | 1/2015 | Goldberg |
| 2015/0040225 A1 | 2/2015 | Coates et al. |
| 2015/0135287 A1 | 5/2015 | Medeiros et al. |
| 2015/0156212 A1 | 6/2015 | Khatri et al. |
| 2015/0186618 A1 | 7/2015 | Poorvin |
| 2015/0222652 A1 | 8/2015 | Ramsey et al. |
| 2015/0271047 A1 | 9/2015 | McLean |
| 2015/0324457 A1 | 11/2015 | McLean |
| 2016/0014140 A1 * | 1/2016 | Akireddy .............. H04L 63/105 726/1 |
| 2016/0099963 A1 | 4/2016 | Mahaffey |
| 2016/0139886 A1 | 5/2016 | Perdriau |
| 2016/0182546 A1 | 6/2016 | Coates et al. |
| 2016/0241591 A1 | 8/2016 | Ramsey et al. |
| 2016/0313709 A1 | 10/2016 | Biesdorf |
| 2016/0337400 A1 | 11/2016 | Gupta |
| 2016/0342805 A1 | 11/2016 | Lim |
| 2016/0378978 A1 | 12/2016 | Singla |
| 2017/0026343 A1 | 1/2017 | Wardman |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318034 A1 | 11/2017 | Holland |
| 2018/0089574 A1 | 3/2018 | Goto |
| 2018/0091306 A1 | 3/2018 | Antonopoulos |
| 2018/0124073 A1 | 5/2018 | Scherman |
| 2018/0124085 A1 | 5/2018 | Frayman |
| 2018/0152480 A1 | 5/2018 | Kinder et al. |
| 2018/0181599 A1 * | 6/2018 | Crabtree ............ G06K 9/00979 |
| 2018/0367550 A1 | 12/2018 | Musuvathi |
| 2019/0014149 A1 | 1/2019 | Cleveland et al. |
| 2019/0050554 A1 | 2/2019 | Fiske |
| 2019/0095801 A1 | 3/2019 | Saillet |
| 2019/0149564 A1 | 5/2019 | McLean |

(56) References Cited

U.S. PATENT DOCUMENTS

2019/0342296 A1   11/2019   Anandam
2019/0377832 A1   12/2019   McLean et al.
2019/0379678 A1   12/2019   McLean et al.

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017: Atlanta, GA, USA.

Sofya Raskhodnikova & Adam Smith; CSE 598A Algorithmic Challenges in Data Privacy; Lecture 2; Jan. 19, 2010.

\* cited by examiner

SYSTEMS AND METHODS FOR SHARING, DISTRIBUTING, OR ACCESSING SECURITY DATA AND/OR SECURITY APPLICATIONS, MODELS, OR ANALYTICS

BACKGROUND

In general, managed network or system security programs or platforms are designed to try to detect threats from malicious actors and take actions to address or remedy such threats. This has resulted in somewhat of a cat-and-mouse game, with "good guys" on one side trying to counteract "bad guys" on the other side; but unfortunately, the "good guys" have been fundamentally disadvantaged, since a "bad guy" or malicious actor can take actions that may seem relatively small, for example, using rudimentary, relatively cheap technology, that may have very large impact and require large expensive efforts on behalf of the good guys. Malicious or threat actors further often test their attacks on smaller, less sophisticated data controllers to make sure that such attacks are viable or are generally successful at penetrating known security before such attacks are deployed against larger, more sophisticated data controllers. Also, many times the actions taken by attackers/malicious actors only become recognizable as part of a threat or become apparent in hindsight, and only are noticeable/detectible sometime after security has been initially compromised, and/or with threat/malicious actions frequently changing or modifying their tactics, making it difficult to quickly identify, detect and/or stop malicious actors/attackers from inflicting serious harm.

Accordingly, it can be seen that a need exists for security experts to be able to share security data, threat intelligence and analytics to allow the rapid development of new or updated security applications or models for detecting or deterring malicious actors. The present disclosure addresses these and other related and unrelated problems in the art.

SUMMARY

Briefly described, the present disclosure is, in one aspect, directed to a security platform or system that enables security analysts, security researchers, security application developers, security incident responders, and/or the entire community of security practitioners, or other entities and/or communities/groups of entities, to rapidly develop new security analytic applications, for example, using artificial intelligence, neural networks, machine learning, statistical analysis, or other probabilistic modeling, as well as to upgrade or modify existing applications or models to detect malicious activity or attacks with enhanced efficiency and to take actions for addressing such attacks or threats. The platform can allow for access to and/or sharing of data gathered from various sources, such as log files from security monitoring, net flows, end point data, etc., to help security practitioners and other researchers generate models or applications that can be applied to such data and the results, and any updates or modifications, shared between like data developers or owners, including data controllers that are a part of selected data sharing or threat analyzing, communities, groups, etc., to enable enhanced or leveraged creation of development/deployment of applications for responding to and defeating/stopping malicious actors quickly and/or efficiency. These data sharing and applications developed with such data further can allow for a network effect that can result in better detection and/or prevention of and/or remedial actions responsive to acts by malicious actors or attackers than could be achieved by any singular data controllers. Moreover, the detection and/or prevention generally continue to improve as the set of participants grows. For example, by leveraging the network effect, a plurality of data controllers using or otherwise accessing the platform may be able to benefit from the actions taken/analysis of shared data by a number of shared data controllers analyzing and/or applying security modules/applications to this data in parallel, and/or new or updated security applications or models developed thereby.

The platform, however, further enables data controllers to exercise greater control over their proprietary data by providing them with tools to select, filter out, or prevent access to particular/selected security data according to developed or set data parameters or policies based on internal or external controls, such as compliance with governmental regulations or privacy concerns. Developed security or data analysis applications, as well as updates or modification thereto, thus further can be shared through an open marketplace, while all or at least some of the data controllers' data received, obtained, collected or otherwise aggregated, e.g., from security logs, net flows, end point monitoring, etc., can be controlled by the data controller, and can remain in situ at a data controller's location, for example, at a data center or management center managed by the data controller or their authorized agent (e.g., MSSP, security analysts, etc.), with only selected security data or aspects thereof being shared, e.g., metadata being shared vs. data records including social security, health, or other client proprietary information.

In one example embodiment, the platform can include a cloud based or other suitable network based platform that can be accessed by a plurality of data controllers that subscribe to the platform or are clients of an MSSP managing the platform. The platform further generally will be software and/or hardware agnostic so as to be operable across disparate hardware and software platforms and devices and can comprise a network of inter-related, connected data stores and compute/software modules, which compute/software modules generally can be created by a developer, e.g., entities associated with the data developer/owner, an MSSP, and/or other application developer/provider. The compute/software modules used and controlled by the platform additionally may include any suitable security applications or modules and may be placed into pipelines, e.g., a plurality of modules that are executable in a prescribed sequence. For example, a plurality of selected modules or module pipelines can be executable or deployable for publishing, sharing or otherwise providing access to security data, such as between data controllers that may be partners or similarly interested/situated (e.g., Credit Card Companies, Banks, E-Retailers, Web Service Providers, Health Care Providers, etc.) and can be executable/deployable to ingest or filter, normalize, interpret and/or analyze their own security data and security data shared by/accessed from other data controllers, and determine/develop, create, and/or update or modify new or existing remedial actions for detecting and responding to potential security threats or malicious actions.

Data controllers and/or data producers will create data and can develop or set data policies to control use and/or availability of such data or selected/filtered portions thereof to the system network. For example, data producers may include entities associated with the data controllers, e.g., managers, employees, IT staff, etc., or can include entities associated with the MSSP. The data policies may dictate, for example, specific areas or locations in which the data can and/or cannot be transmitted/shared/accessed, specific entities who can and/or cannot access the data, e.g., like actors, partners, shared information communities, MSSPs, etc., and specific data that must be filtered and cannot be shared or accessed by the platform, or others outside the data controllers, e.g., data subject to governmental compliance or regulations, privacy concerns, etc. A publisher further can develop/deploy the modules, as well as module policies for the platform, for example, publishers can include an MSSP or third party security application developer, though the publisher can also be the data controllers, data producers or any other suitable entity.

The modules or module pipelines can include executable modules for taking one or more actions on or for otherwise processing the data, i.e., security data generated by the data producers and accessed by the data controllers, the MSSP or other security practitioners and/or security data shared between data controllers, etc. For example, the platform can allow for the development or generation of modules or module pipelines for normalizing the security data; creation/updating/modifying of probabilistic models, machine learning, named entity recognition, artificial intelligence, etc., for interpreting and/or detecting security threats and/or malicious or suspicious actions; for taking actions or remediation measures for detected security threats/malicious activity; and modules or module pipelines for sharing other otherwise providing access to the security data, e.g., to provide access to similarly interested actors, partners, information communities MS SPs, etc. Additionally, an infrastructure provider, which can be an MSSP, a data controller, or an entity associated with the data controllers, can create and make infrastructure policies or parameters available to the system. The developed/set infrastructure policies or parameters can determine when and where and what resources are used to execute the modules.

From these and other available resources, an instantiator, in some embodiments, a data controller or MSSP operating the platform, can request execution of software modules to process data using infrastructure according to the policies and platform configuration. In other embodiments, such instantiation requests can be generated automatically as part of on-going security monitoring and analysis. Upon instantiation, a platform broker can schedule execution of a selected plurality or set of modules or module pipelines. The platform broker can determine whether to execute the plurality of modules or module pipelines based on the developed and/or pre-set data parameters or policies, application module execution policies or parameters, and/or infrastructure parameters or policies. Additionally, over time, historical metrics can be used/factored to provide additional information as to trends to the broker. If execution of the model violates the developed or set parameters, policies and/or historical metrics, the modules or module pipeline will not execute and feedback can be provided to the instantiator, who might take action to any appropriate broker input in effort to remedy the failure condition for future instantiations. If the applicable data, module and/or infrastructure policies or parameters and/or metrics are not violated, the broker may execute the selected modules or module pipelines. Once executed, the module/module pipelines will produce additional data and/or effect an action external to the platform, e.g., to normalize the security data; interpret security, apply probabilistic models or other analytics, and/or detect security threats and/or malicious or suspicious actions; take action or remediation measures for detected security threats/malicious activity; share other otherwise provide access to the security data, e.g., provide access to similarly interested actors, partners, information communities MSSPs; etc.

In another aspect, a method for sharing and monitoring data and building threat monitoring applications is provided. The method can include collecting or accessing data, and developing or setting data policies or parameters, e.g., by data controllers, data producers and/or an MSSP(s). The method also may include developing and/or generating modules or module pipelines to apply to the security data, for example, developing modules or module pipelines for normalizing the security data; developing, modifying, updating and/or applying analytics including probabilistic models, machine learning, named entity recognition, etc., for interpreting and/or detecting security threats and/or malicious or suspicious actions; modules or module pipelines for taking actions or remediation measures for detected security threats/malicious activity; and creating or generating modules or module pipelines for sharing other otherwise providing access to the security data, e.g., to provide access to similarly interested actors, partners, information communities MSSPs, etc.; as well as developing and/or setting module parameters or policies, e.g., by the MSSP or at the data controller site(s). The method also can include developing and/or setting infrastructure parameters or policies at the data controllers site(s), e.g., by the MSSP and/or by the data controllers. The method further may include generating historical module execution metrics for executing the modules or the module pipelines. For example, metrics may be used to measure the execution cost, performance characteristics, or the efficacy of the module, or other suitable properties or characteristics.

With the method/process of the present application, upon initiation or receipt of a request execution of the modules or module pipelines, a platform broker, which can be resident on or accessed by a data controller's network/servers (internal hardware) or at a linked MSSP or other system, can determine whether to schedule execution of a selected set of modules and/or module pipelines based on the developed and/or set data parameters or policies, module execution policies or parameters, infrastructure parameters or policies, historical module execution metrics. For example, if scheduling execution of the modules or module pipeline would violate any of such applicable data module, infrastructure and/or historical policies, parameters or metrics, the broker will not execute the modules or the module pipeline and will generate feedback to the instantiator. If the applicable data/module/infrastructure, policies, parameters, meters are not violated, the broker will execute modules or module pipeline and take action required by module/module pipeline, e.g., to normalize the security data; interpret security and/or detect security threats and/or malicious or suspicious actions; take action or remediation measures for detected security threats/malicious activity; share other otherwise providing access to the security data, e.g., provide access to similarly interested actors, partners, information communities MS SPs; etc. Such execution further may generate new or updated security data for use in later analysis.

Various objects, features and advantages of the present disclosure will become apparent to those skilled in the art upon a review of the following detailed description, when taken in conjunction with the accompanying drawings.

BRIEF DESCRIPTION OF THE FIGURES

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
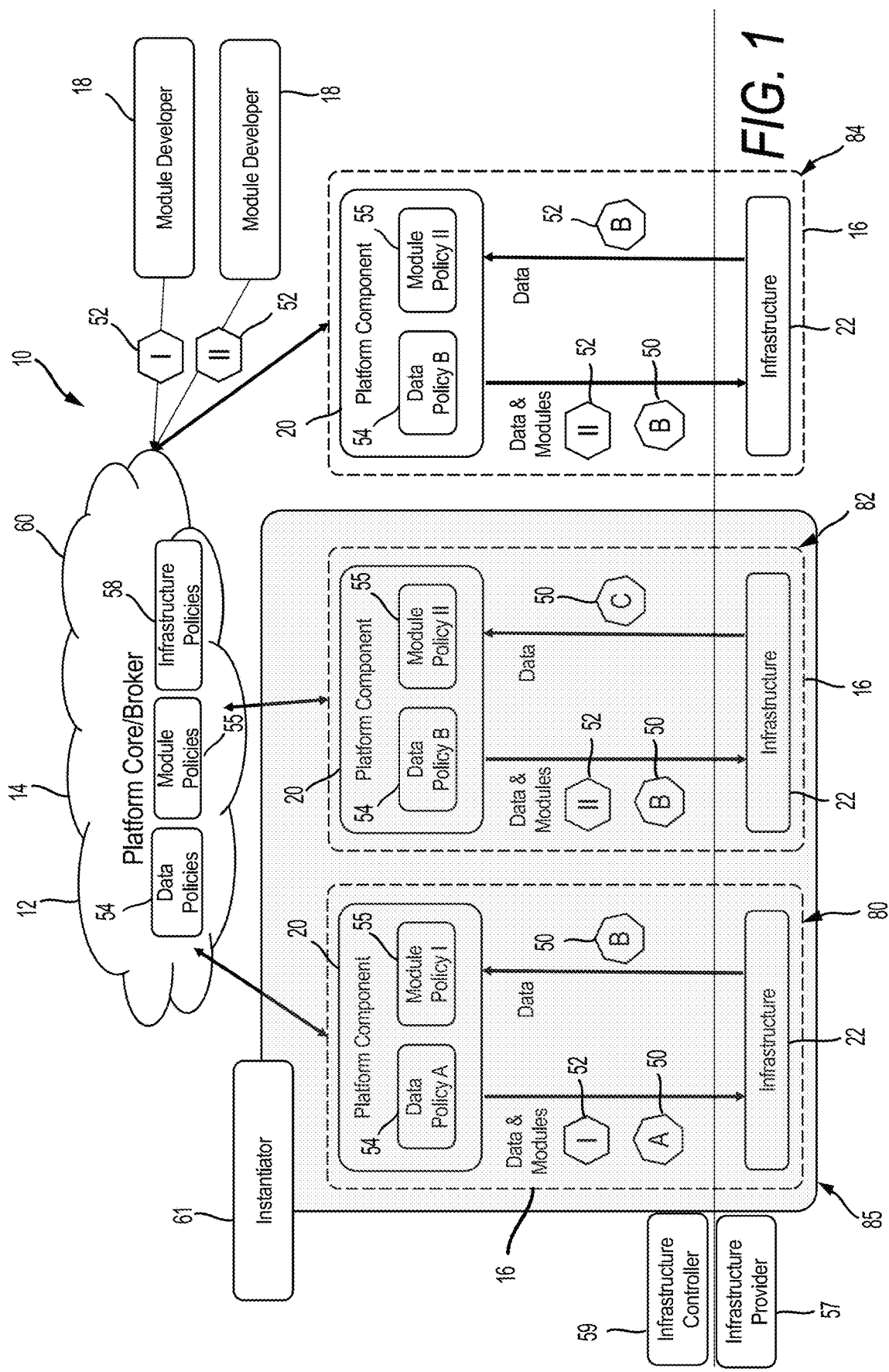
FIG. 1 is a schematic diagram of a system for sharing, distributing, or accessing security data and/or security models, applications, or analytics according to principles of the present disclosure.

FIG. 1 shows a schematic diagram of a system 10 for sharing, distributing, or accessing security data and/or security models, applications, or analytics. The system 10 can include a platform 12, with a platform broker or core 60, that can be at least partially implemented on a cloud-based network or other system 14, and can be accessed by a plurality of platform participants 16. The platform participants 16 may access the platform 12 through an external or internal network, such as the Internet, a virtual person network (VPN), or other suitable public or private network or connection or suitable communication lines. The platform 12 further can be accessed by or can be in communication with a plurality of module developers 18, which can include internal or third party application developers or providers, that can develop modules 52 for processing of data 50 accessed by the platform participants 16 according to one or more data 54, module 55, and/or infrastructure 58 policies or parameters.

In addition, as shown in FIG. 1, the platform 12 or versions/components thereof can be resident on servers/systems/networks managed or otherwise controlled and/or accessed by the platform participants. For example, the platform 12 can include one or more components 20 executed or run at sites/infrastructure 22 managed or accessed by the platform participants, for example, one or more information handling systems or a network of information handling systems managed or accessed by the platform participants. The platform components 20 can be configured to allow for or otherwise facilitate substantially seamless execution of the platform and enable the platform to be infrastructure agnostic, or hardware and supporting software agnostic, with the platform components being configured to interface with selected systems/networks, e.g., systems or networks managed or accessed by one or more selected ones of the platform participants. The platform also could be configured to run on any capable, commodity hardware and/or underlying or provided software (e.g. Operating System and supporting software).

Still further, the platform may allow analytics to be developed that are independent of data source being processed thereby. For example, a single analytic can be run across a plurality of data sources, data types, and/or infrastructures, e.g., specific physical data locations. In one example embodiment, an analytic can be run on DNS data originating from various DNS servers that each may log differently and/or store in different systems and/or, e.g., the analytic may be unmindful of the nature of the storage system and native formatting of log messages, analytic code may access all the data for which it has rights to access to no matter the physical location or logical storage. Additionally, it should be understood that users of the platform are able to easily/readily add new data sources and types to the platform.

FIG. 1 further shows that the platform participants 16 can manage, operate, or otherwise access various infrastructure, for example, public, private, or on premise infrastructure 22. For example, one or more of the platform participants can have on site or on premise infrastructure that can include a data center 24 or other networked system of information handling systems/devices. In some embodiments, however, the platforms participants infrastructure can be operated by a separate or other third party, e.g., an infrastructure provider or technology partner, on behalf of the platform participant, though the data center may be operated any suitable entity without departing from the scope of the present disclosure. In one embodiment, some platform participants may use or access a cloud computing platform or other suitable web service, such as Amazon Web Services and/or one or more third-party data managers, such as Splunk® or Cloudera®, and the platform 12 may be operable to integrate or otherwise communicate with these services.

Figure 2:
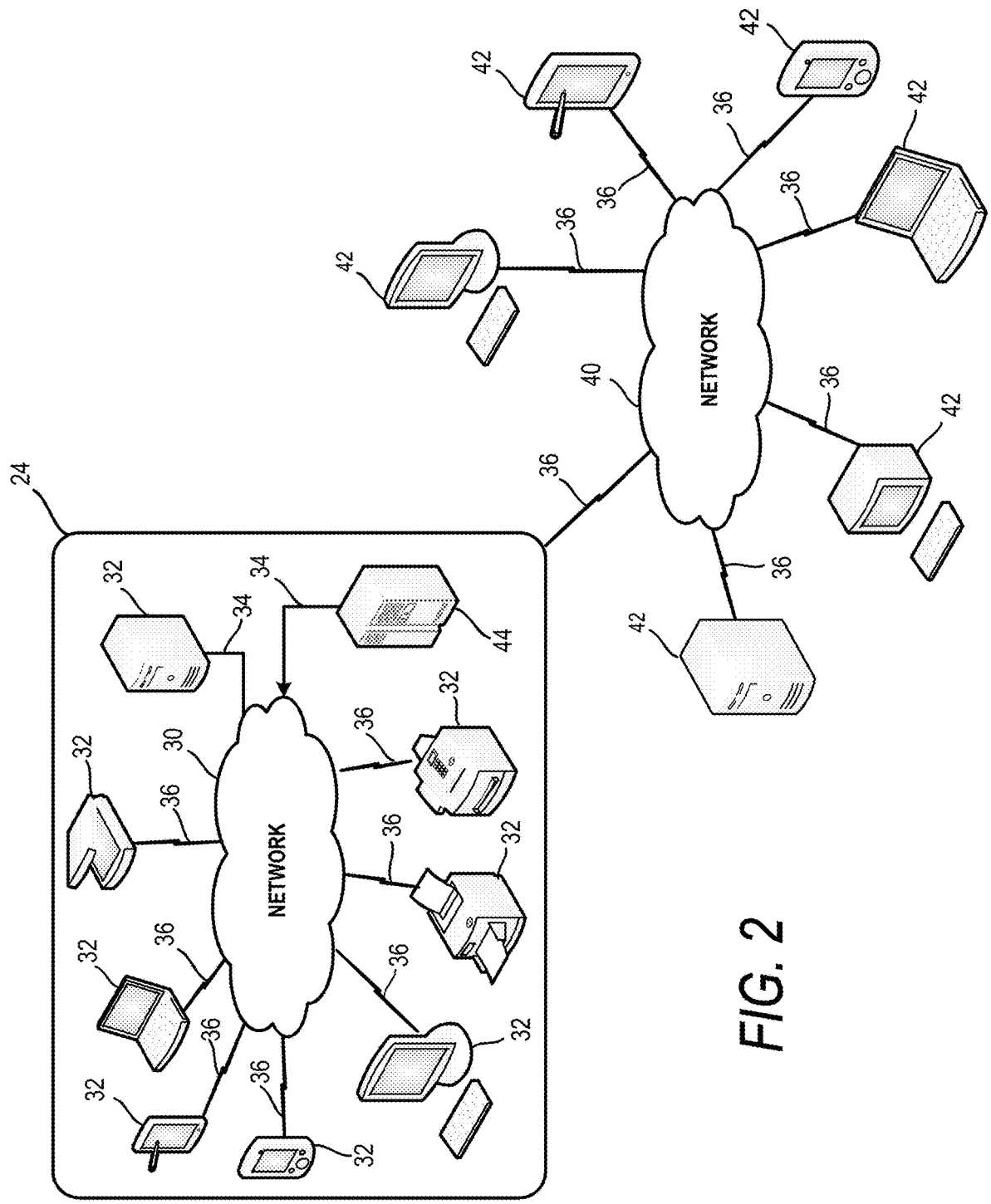
FIG. 2 is a schematic diagram of a data center including a networked system of information handling systems according to one aspect of the present disclosure.

FIG. 2 is a block diagram of an exemplary data center 24 managed, operated, or accessed by a platform participant 16. The data center 24 can include an internal network 30 that may provide communications among a plurality of information handling systems 32, which can include work stations, personal computers, smart cellular telephones, personal digital assistants, laptop computers, servers, printers, scanners, copiers, multifunctional devices, other suitable devices, and/or combinations of devices. The information handling systems 32 further can be coupled to the network 30 through wired line connections 34, wireless connections 36, or any other suitable lines of communication. As further shown in FIG. 2, the data center 24, and/or information handling systems thereof, can be communicatively coupled to an external network 40, for example, through wireline connection 36, or through any other suitable connection, such as a wireless connection (e.g., WiFi, cellular, etc.). The network 40 further can be accessible to/by the one or more client managed information handling systems or devices 42 to facilitate communication between the client managed information handling systems 42 and the data center 24. The network 40, can include an Internet or cloud-based or another wide area network, a local area network, or a combination of networks, and may provide data communications among the data controllers and the client managed information handling systems 42.

The client managed information handling systems 42 can be connected to the network through wired connections, e.g., an Ethernet cable, or other suitable wired connections, or wireless connections 36, e.g., WiFi, Bluetooth®, cellular connections (e.g., 3G, 4G, 5G LTE), other suitable wireless connections or combinations thereof (FIG. 2), to enable the operators of the client managed information handling systems 42 to access one or more services provided by the platform participants. For example, the platform participants can include banks, credit card companies, or other financial services providers that can, e.g., provide online financial services and/or otherwise facilitate online financial transactions. The platform participants further can include hospitals, health insurance companies, or other health care service providers that may provide one or more online health care services or share patient information. The platform participants can provide any suitable services, however, without departing from the present disclosure, for example, platform participants can provide online gaming services, social media or online dating services, online data storage services, online retailer services, music steaming services, etc. The platform participants further are not limited to the example services/operations set forth above, however, and can include any entity that owns or is in control of or otherwise accesses data, for example, data generated from any system, network, set of transactions, communications, operations, etc. It should be understood that the platform participants can be data controllers that interpret, store, and/or otherwise control ingest, aggregated, or otherwise collected security data or other data, however, the data controllers can be a separate third party or technology partner, such as web service provided, third party data manager, an MSSP or other security service provider, and/or any other suitable entity or combination thereof.

As additionally shown in FIG. 2, the data center 24 further may include at least one monitoring device 44 communicatively coupled to the network 30, which monitoring device 44 further can be operable to store and execute computer readable instructions to continuously monitor, in real time, activity at each network system, for example, activity of information handling systems connected to the network. Such monitoring activity can include logging on or logging off of networks by the information handling systems, downloads or uploads, changes to settings, use of the devices, etc. Additionally, network activities such as executed processes (e.g., type, number of times accessed, resulting actions, etc.), types and/or numbers of files modified, net flow aggregate, and other similar activities can be monitored and collected as part of security logged data/records. It will be understood, however, that the monitoring system 44 is optional and monitoring or other security services can be done by any of the devices or information handling systems in communication with the network managed or accessed by the platform participants or data controllers, for example, each of the devices/information handling systems can run or otherwise access an end point software agent or antivirus software that may monitor and/or collect or aggregate security data or otherwise security relevant data, though any suitable data can be collected, obtained, aggregated, or otherwise accessed without departing from the present disclosure. As an additional example, a partial or complete model can be compiled on from different locations/data sets, including data stored in a cell on the premise, that model being sent back centrally, aggregated with other models and distributed back to all the cells.

For purposes of the present disclosure, the information handling systems 32/42 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include a storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components. The platform 10 according to embodiments of the present disclosure can be accessed by the platform participants, e.g., with information handling systems 32/44, or information handling systems managed by third party technology partners, an MSSP, security analysts, security researchers, security application developers, security incident responders, or other suitable entity, or additionally or in the alternative parts of the platform 10, e.g., a platform components, can be run on such information handling systems.

The platform 12 can enable platform participants, MSSPs, security analysts, security researchers, security application developers, security incident responders, technology partners, and/or various other security practitioners, or other entities within the community and/or communities/groups of entities, such as the data controllers or information sharing communities including multiple platform participant or data controllers, to rapidly develop new security analytic applications, for example, using artificial intelligence, neural networks, machine learning, named entity recognition, statistical analysis, or other probabilistic modeling, as well as to upgrade or modify existing applications or models to detect malicious activity or attacks with enhanced efficiency and to substantially reduce response times for addressing such attacks. The platform 12 further can allow for access to and/or sharing of data gathered from various sources, such as log files from security monitoring, net flows, end point data, or other security data or data that may have security relevance, though any suitable data or information can be accessed or shared without departing from embodiments of the present disclosure between platform participants, data controllers, MSSP(s), various other security partners, and/or other entities, to help platform participants, MSSPs, security analysts, security researchers, security application developers, security incident responders, technology partners and/or data controllers or other entities rapidly generate modules, e.g., including models or applications that can be applied to such data and the results, and any updates or modifications.

Security data, modules, applications, analytics etc. also can be shared between, or otherwise accessed by, like platform participants, e.g., data controllers that are a part of selected communities, groups, etc., to enable the rapid creation of development/deployment of applications for defeating/stopping malicious actors. Security data further can be shared with other suitable entities, such as MSSPs, security analysts, security researchers, security application developers, security incident responders, etc. Initiated, developed and/or modified/updated security or data analysis applications, as well as updates or modification thereto, also can be shared through an open marketplace, as needed, while the platform enables all or at least some of this data received, obtained, collected, aggregated or otherwise accessed to be substantially closely controlled by a data controller, and may remain in situ at a data controllers location, for example, being secured/maintained on the data center or management center 20 managed by or access by the data controllers. The platform 10 thus will be configured to enable/allow the data controllers to select, filter out, or prevent sharing and/or access to particular/selected security data according to developed or set data parameters or policies based on internal or external controls, such as compliance with governmental regulations or privacy concerns. As a result, the data controllers can actively control where their data stays and how it is to be shared/who gets access, as well as what specific data may be shared/accessed (e.g., only metadata may be shared/accessed, while more sensitive, proprietary information such as social security, health or financial information stays on the owner's server and under their control), while still enabling data controllers to leverage all the analytics, responses, network effect and threat intelligence with the platform.

Figure 3:
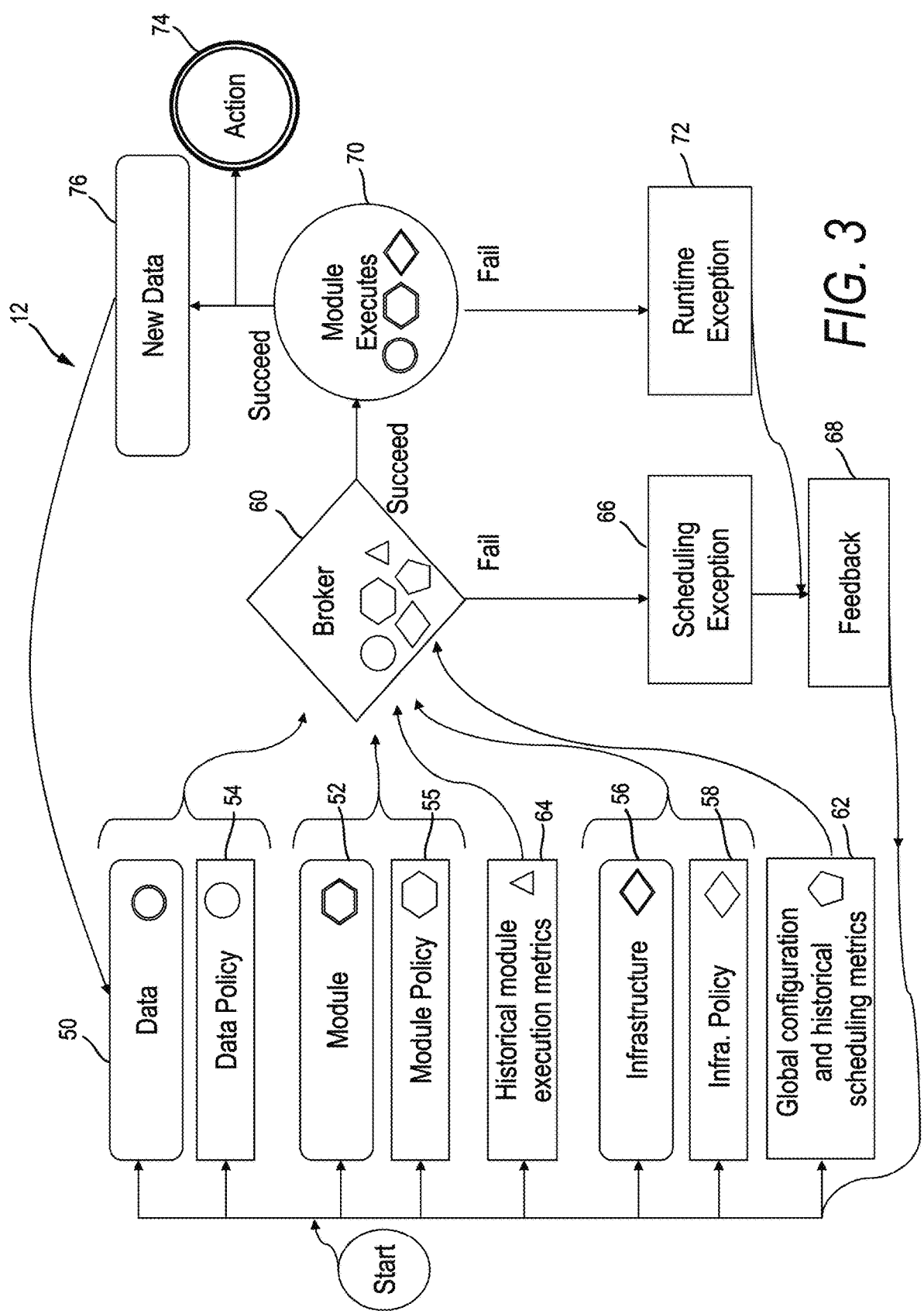
FIG. 3 shows a schematic diagram of the platform according to one aspect of the present disclosure.

FIG. 3 shows a schematic diagram of the platform 12 according to one aspect of the present application. The platform 12 generally will be device/system or infrastructure agnostic, so as to be operable with a variety of different hardware platform/devices and/or software/operating systems. As shown in FIG. 3, the platform 12 can comprise a network or plurality of inter-related, connected data stores 50 and compute/software modules 52. The compute/software modules 52 generally can be created by a module developer 18, e.g., an MSSP, security analysts, security researchers, security application developers, security incident responders, and/or the entire community of security practitioners, or other platform participant, though the data controller and entities associated therewith also can develop or create the modules. The compute/software modules 52 can include security applications or modules, or other suitable application or modules, and generally will be configured to be enabled arranged or placed into pipelines, e.g., a plurality of modules that are executable in a prescribed sequence. For example, a plurality of selected modules or module pipelines can be executable or deployable for publishing, sharing or otherwise providing access to security data, such as between data controllers that may be partners or similarly interested/situated (e.g., Credit Card Companies, Banks, E-Retailers, Health Care Service Providers, Web Service Providers, etc.), and can be executable/deployable to ingest or filter, normalize, interpret and/or analyze their own security data and security data shared by/accessed from other data controllers, and determine/develop actions for detecting and potentially responding to security threats or malicious actions.

As further shown in FIG. 3, the platform 12 can include data stores 50, which can include, receive, or otherwise access data 50 created, collected by, or otherwise accessed by the data controllers, MSSP, third party technology partners, other entities, etc. Such data can be created by data producers, which might include entities associated with the data controllers, e.g., managers, employees, IT staff, etc., that may operate and/or interface or otherwise interact with the information handling systems 32, and/or can include clients of the data controllers, e.g., customers, consumers or other persons/entities that operate, interface, and/or otherwise interact with the information handling systems 42. Additionally, or in the alternative, data producers can include entities associated with the MSSPs security analysts, security researchers, security application developers, security incident responders, and/or other security practitioners, and/or any other data producing entities or platform participant without departing from the present disclosure.

The platform participants, data controllers, or entities associated therewith, e.g., data producers, further can develop or set data policies 54 for use by and/or availability of such data to the platform. An MSSP or other security provider, or any other suitable entity, also can develop and set data policies, however, without departing from the present disclosure. In one embodiment, the data policies 54 may dictate, for example, specific areas or locations in which the data can and cannot be accessed, specific entities who can and cannot access the data, e.g., like actors, partners, shared information communities, MSSPs, etc., and specific data that cannot be accessed by the platform, e.g., data subject to governmental compliance or regulations, privacy concerns, etc.

By way of example, the data policies may be developed or set based upon regulations or requirements such as governmental regulations as required under the Health Insurance Portability and Accountability Act ("HIPAA") or the Sarbanes Oxley Act, General Data Protection Regulation ("GDPR"), to thus prevent access to data that would violate these laws/regulations. In another example, like actors, such as banks or credit card companies may want to set data policies/parameters which will allow for some (typically limited) data access or sharing therebetween, e.g., American Express, Visa, Discover, and/or MasterCard may wish to share access to at least certain security data, because malicious entities/threat actors may take similar actions against credit card companies, but at the same time, need to be able to restrict access/sharing of particular client/customer information. Data policies accordingly can be set to not only filter out what data can be shared/not, but also to control what platform participants, e.g., like actors, partners, and/or members of information sharing communities or can access security data collected by other like actors (including territorial and other controls), so long as the permitted access or sharing does not violate other data policies/parameters, e.g., developed or set by the data controllers based on governmental compliance, privacy issues, and/or jurisdictional concerns. In some cases, for example, like actors such as banks, etc., may include entities or subsidiaries that have a presence in various countries and jurisdictions with differing laws/regulations, and the platform broker can implement policies to restrict/prevent access by such foreign based subsidiaries or entities based on compliance with such laws or due to other security concerns in such foreign jurisdictions. Such sharing by like actors, partners and within information sharing communities also can contribute to a network effect that can lead to an increase in detection/prevention of security threats or malicious actors.

A publisher also can develop/deploy the modules 52, as well as module policies 55 for the platform, for example, publishers can include an MSSP or third party security application developer, though the publisher can also be the data controllers, data producers, or any other suitable entity without departing from the present disclosure. The modules 52 can include executable modules for taking one or more actions on or for otherwise processing the data, i.e., security data generated by the data producers and accessed by the data controllers, the MSSP, etc. and/or security data shared between data controllers or other entities, e.g., security analysts, security researchers, security application developers, security incident responders, other security service providers, etc. Further, the modules 52 can be used as a part of one or module pipelines for specific processing of the data. In one example embodiment, the platform 10 can allow for the development or generation of modules 52 or module pipelines for normalizing the security data; creation/updating/modifying probabilistic models, machine learning, named entity recognition, etc., for interpreting and/or detecting security threats and/or malicious or suspicious actions; for taking actions or remediation measures for detected security threats/malicious activity; and modules or module pipelines for sharing other otherwise providing access to the security data, e.g., to provide access to similarly interested actors, partners, information communities, MSSPs, security analysts, security researchers, security application developers, security incident responders, other security practitioners, etc. Modules/module pipelines further can be developed to process (e.g., ingest, normalize, interpret, decide, act, etc.) security data from a particular machine or device (e.g., a particular medical machine, such as an MRI or CT scan machine) and can be shared or accessed between participants to allow for rapid detection of abnormalities or security threats or issues. The module policies or parameters may dictate when and how the modules are to be executed, for example, module policies may be set to require that the modules be executed as part of a prescribed infrastructure; or that the modules not be executed, or only be executed in specific locations, e.g., geographic locations; or only by entities, e.g., with a certain privileges or level of access or specific publishers or communities to execute on specific data; or based on cost or service level agreements; etc.

Additionally, an infrastructure provider 57, which can be an MSSP or other security service provider, can make infrastructure 56 and infrastructure policies or parameters 58 available to the platform, which infrastructure polices/parameters may be implemented by an infrastructure controller 59. The infrastructure provider can include any suitable entity, e.g., the platform participant, data controller, or an entity associated therewith, e.g., data producers, MSSPs, other security service providers, or third party technology partners, without departing from the present disclosure. In one example, the developed/set infrastructure policies or parameters 58 can determine when and where and what resources are used to execute the modules, for example, an infrastructure policy may mark a particular module or module pipeline to only be executable by a particular entity or within particular community or region (e.g. Banks in North America), and if module execution is scheduled by a different entity or in a different region (e.g., a Bank in Europe) execution will fail due to an infrastructure policy. It should be recognized, however, that any suitable attributes or features can be encompassed in the infrastructure policies/parameters, without departing from the present disclosure.

From these and other available resources, an instantiator 61 can request execution of software modules 52 to process data using infrastructure according to the policies and platform parameters (including configuration and other attributes). An instantiator can include any entity that initiates execution of the platform, e.g., platform participants, a data controller, MSSP or other security provider, or an automated entity that may initiate execution of the platform to carry out one or more operations or processes. Upon instantiation, a platform broker 60 can schedule execution of a selected plurality or set of modules or module pipelines 52. The platform broker 60 can determine whether to execute the plurality of modules or module pipelines based on the developed and/or pre-set data parameters or policies, module execution policies or parameters, and/or infrastructure parameters or policies, as well as the global configuration of the platform 62.

Additionally, over time, historical scheduling metrics and/or historical module execution metrics 64 can be used/factored to provide additional information as to trends to the broker 60. Historical metrics also may be developed as various policies or parameters are set for data access or module execution. For example, if a data controllers previously develops or sets one or more specific module execution policies/parameters 55, the historical metrics can be renewed and applied to capture previously developed policies/parameters, and the broker 60 accordingly can, upon application of such metrics, prevent scheduling of execution of the modules if the historical metrics are violated even if an explicit policy/parameter is not set.

If execution of the module or pipelines of modules violates the developed or set parameters or policies 54, 55, 58 and/or the historical metrics 64, 62, the broker 60 will not schedule an execution of the modules or module pipeline, for example, a scheduling exception 66 will occur, and feedback, such as in the form of a notice or alarm, will be provided to the instantiator (e.g., as an error message or other indicator can be provided/displayed on a display of a device operated by the instantiator) who might take action to any appropriate broker input in effort to remedy the failure condition for future instantiations. For example, if selected or accessed data for module execution would violate a developed set data policy or parameter, e.g., the instantiator selected, or execution of the module would require access to, personal health data or information that would violate a policy/parameter developed/set for HIPAA compliance, etc. the broker will not schedule execution of the module or module pipeline. The instantiator can then take corrective action to modify the modules or selected data and/or the developed/set policies or parameters so that the module or module pipeline can be scheduled for execution.

If the applicable/selected data, module and/or infrastructure policies or parameters and/or metrics are not violated, the broker 60 may schedule execution 70 of the modules or module pipelines 52. However, if not enough resources are available or another issue prevents execution of the modules, e.g., loss of power, lack of data access, policy change/alteration, programming error, software incompatibilities, resource exhaustion, loss of network connectivity, etc., a run time exception 72 will occur and feedback 68 will be provided detailing the issue to the instantiator.

Once executed, the platform may effect an action 74 external to the platform, e.g., to normalize the security data; interpret security data, apply probabilistic models or other analytics, and/or detect security threats and/or malicious or suspicious actions; take action or remediation measures for detected security threats/malicious activity; share other otherwise provide access to the security data, e.g., provide access to similarly interested actors, partners, information communities MSSP's; etc., and/or new or updated data 76 may be generated, e.g., due to analysis or detections generated by execution of the module/module pipelines, which new data can be provided to the data store 50.

FIG. 1 shows an example of an instantiator 16 that has authority to access data or execute modules/module pipelines of platform participants 80 and 82, but does not have access to the data or modules/module pipelines of platform participant 84 according set data and module policies/parameters as indicated by 85 in FIG. 1. Accordingly, if the instantiator in the example shown in FIG. 1 attempts to execute modules or access data of platform participants 80/82, execution would be successful so long as no other data, module, or infrastructure polices are violated; however, if the instantiator of the example shown FIG. 1 attempts to execute modules or access data of platform participant 84, execution would fail according to the set data/module policies and parameters (e.g., 85) that do not provide access to the modules/data of participant 84.

It should be understood that the module developer, publisher, infrastructure provider, instantiator, etc. can all be the same entity or a combination of entities, for example, platform participants, data controllers and entities associated therewith, e.g., data producers or third party technology partners, MS SPs, security analysts, security researchers, security application developers, security incident responders, other security practitioners, and/or any other suitable entities, without departing from the scope of the present disclosure.

Figure 4:
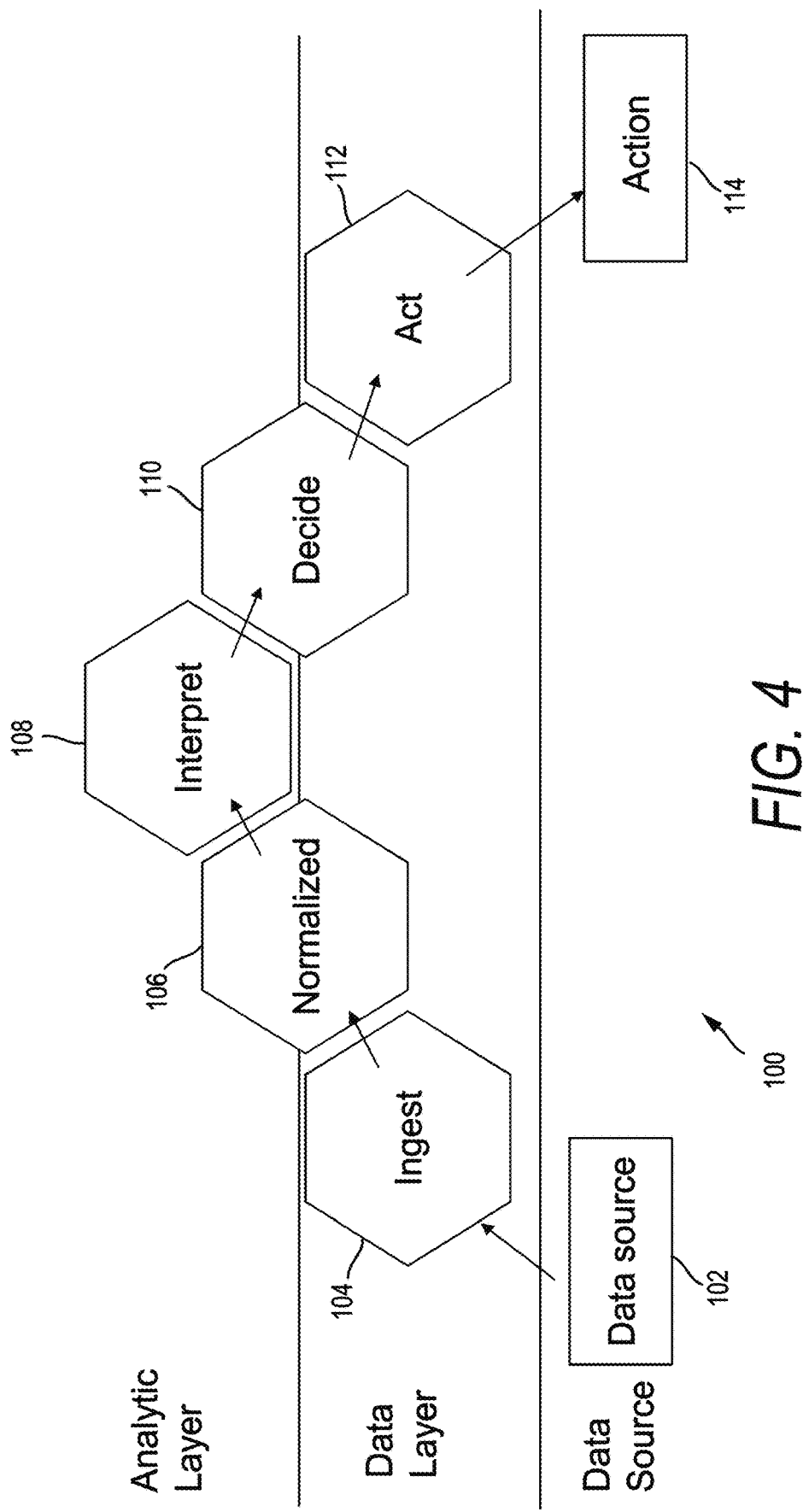
FIG. 4 shows a schematic diagram of an exemplary module pipeline developed using the platform of the present disclosure.

FIG. 4 shows a module pipeline 100 according to one example. As shown in FIG. 4, the platform may accept "raw" data (e.g., incoming data requires no out-of-system pre-processing) from a data source 102 for processing using the module pipeline 100. The module pipeline can include a plurality of modules 104 to 112 operable to ingest the data from a data source 102, prepare the data for analytics 106, interpret or analyze the data 106, use the data as an input in a decision-making process 110, and once a decision 110 has been made, schedule or orchestrate actions 112, e.g., an action 114 can be taken outside of the platform 10 (FIG. 4). An instantiator also may request execution of the module pipeline to process the data accordingly, and if execution of one or more of the modules violates any of the data, module, or infrastructure policies or parameters and/or the developed/generated historical metrics, the broker may not schedule execution any of the modules or the module pipeline.

In the embodiment shown in FIG. 4, the ingest module 104 may select or attempt to access specific portions of the data 102 for processing by the modules 106 to 112 in the module pipeline. If the data selected or attempted to be accessed by the ingest module 104 violates data policies or parameters developed or set for the platform, the broker will not schedule an execution of the ingest module 104, or the other modules in module pipeline 100. With this embodiment, the module pipeline 100 also can include a normalizing module 106, which module 106 can be operable to normalize or otherwise structure the accessed data to prepare the data for use in a interpret module 108. The interpret module 108 may employ analytics or modeling, such as probabilistic modeling, statistical analysis, machine learning, named entity recognition, artificial intelligence, neural networks, etc., to interpret the accessed and normalized data, for example for detection or identification of security threats and/or activities of malicious or suspicious actors. The decision making module 110 further can follow the interpret module 108, which module 110 can be operable to decide a specific action to be taken, e.g., notification of a detected security and/or remediation measures to be taken to mitigate or eliminate the security threat, upon detection of a security threat using the analytics employed in the interpret module 108. The actions to be taken based on the decision made by the decision module 110 may be orchestrated by an action module 112 that can effect one or more actions 114, possibly taken outside of the platform 10.

Figure 5A:
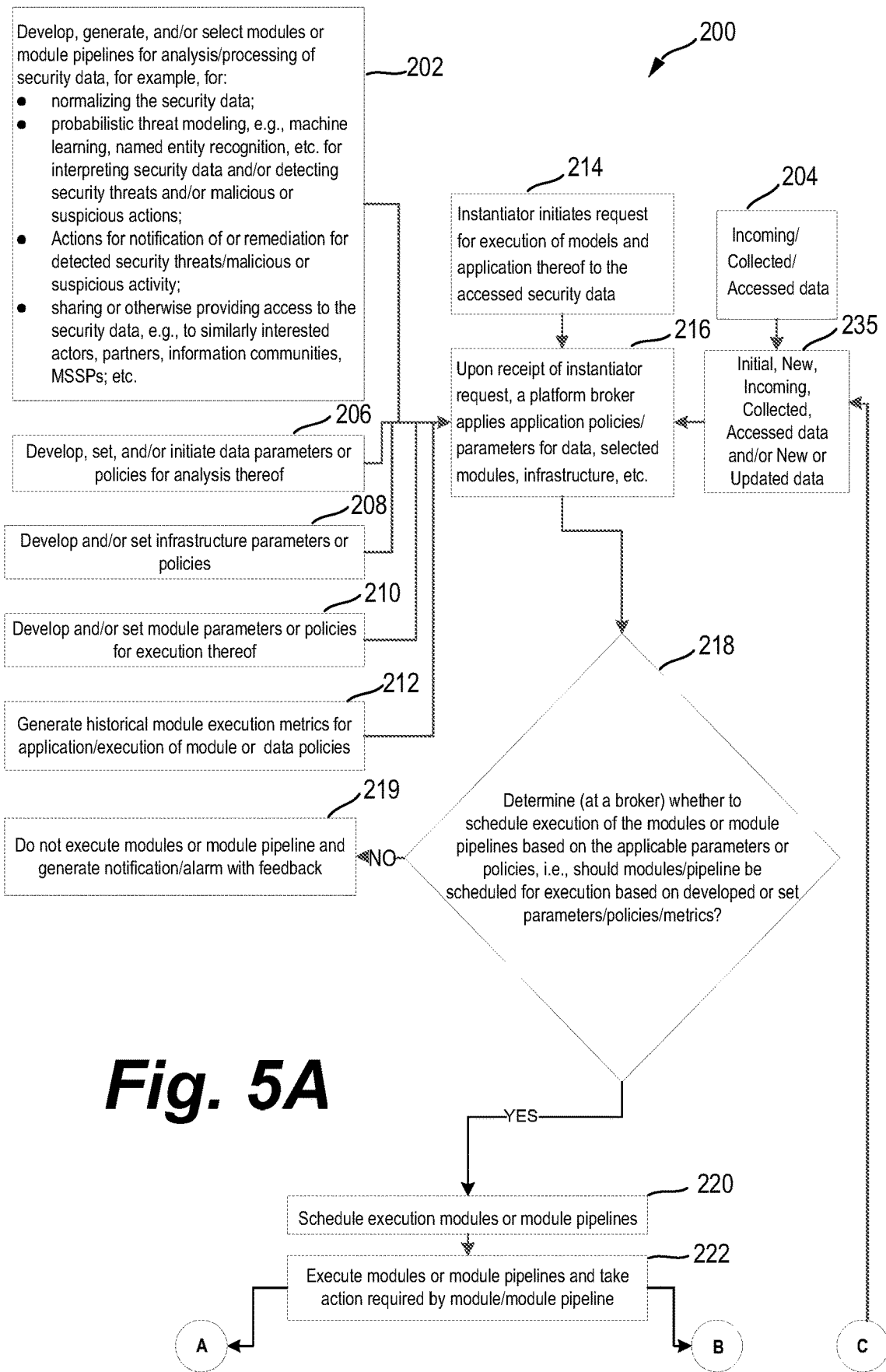
FIGS. 5A and 5B show a flow diagram illustrating a process or method for sharing, distributing, or accessing security data and/or security models, applications, or analytics according to one aspect of the present disclosure.
Figure 5B:
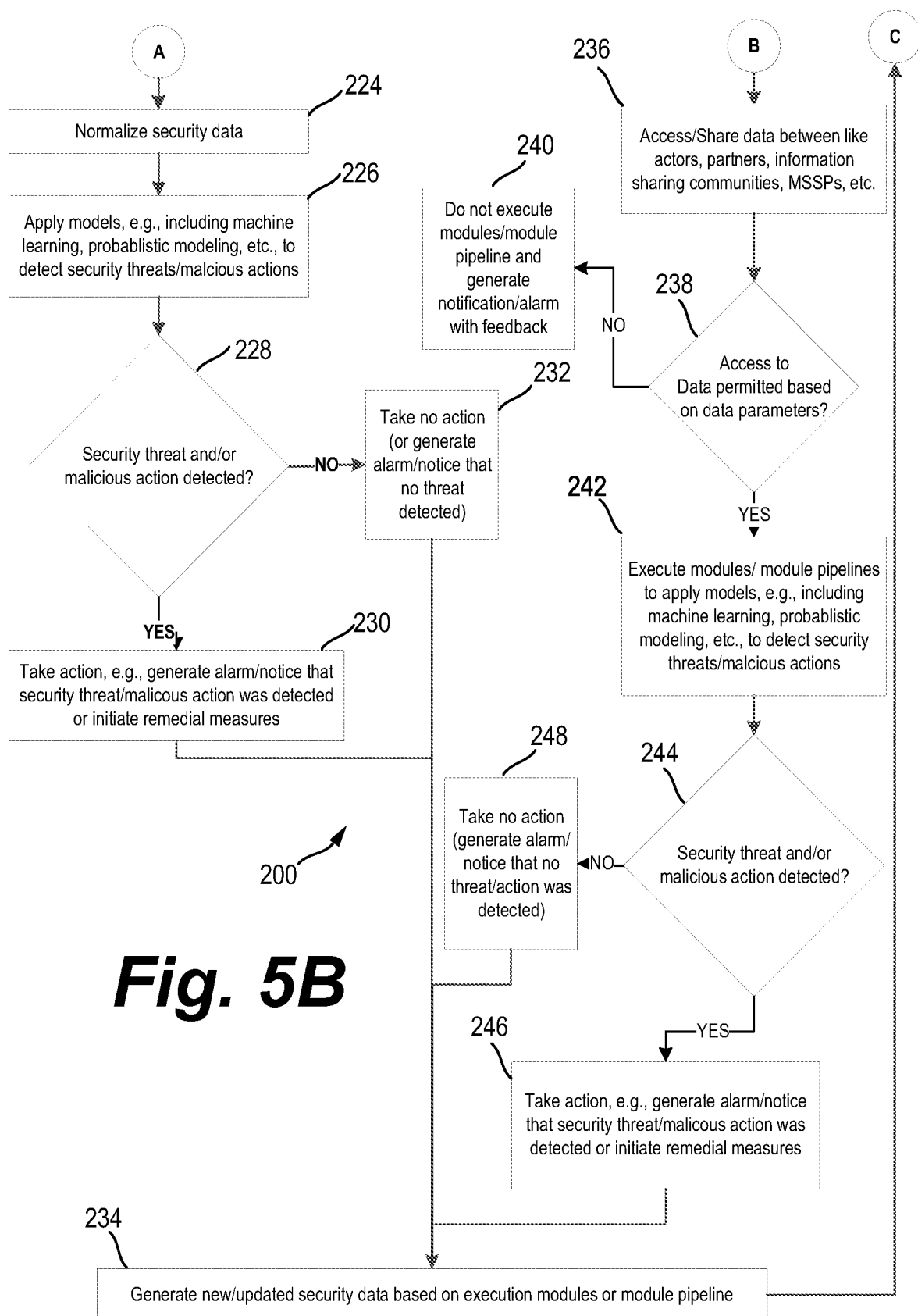

FIGS. 5A and 5B show an exemplary process or method 200 for a platform that enables/facilitates sharing and monitoring of data and/or building threat monitoring applications according to one embodiment of the present disclosure. As shown in FIG. 5A, a developer, e.g., a data controller, data producer, and/or an MSSP, another entity, or combinations thereof, can develop, generate, and/or select modules or module pipelines for analysis and/or processing of security data (Step 202). For example, the modules or module pipelines can be executable to normalize the security data, perform probabilistic threat modeling, using the security data, e.g., statistical analysis machine learning, name identity recognition, etc., for interpreting security data and/or detecting security threats and/or malicious or suspicious actions, take actions for notification of or remediation for detected security threats/malicious or suspicious activity, and/or sharing or otherwise providing access to the security data, e.g., sharing security data between similarly interested/like actors, partners, information communities, MSSPs, or other suitable entities. The security data can be accessed or otherwise received by the platform for processing further at Step 204. Additionally, the data controllers, MSSPs, or other entities further may develop, set, and/or initiate a set of data parameters or policies (Step 206), infrastructure parameters or policies (Step 208), and/or module parameters or policies (Step 210). Historical module execution metrics for application/execution of module or data policies also can be generated (Step 212).

An instantiator can initiate or request for execution of selected modules and application thereof to the accessed security data (at Step 204). Upon receipt of the instantiator request, at Step 218, a platform broker can apply policies/parameters for data, modules, infrastructure set or developed at Steps 206-210, as well as apply the generated historical module execution metrics generated at Step 212, to determine whether to schedule execution of the modules or module pipelines based thereon, i.e., the platform broker may determine whether the modules or module pipelines should be scheduled for execution based on the developed or set parameters/policies/metrics (Step 218). If execution of the modules or access to the security data will violate any one of the set parameters/policies, the platform broker will not schedule an execution of the modules or module pipeline at Step 219, and further can generate a notification or alarm with feedback to the instantiator (Step 219). If no policies or parameters or historical are violated, however, the platform broker can schedule execution of the modules or the module pipelines at Step 220 and thereafter modules or module pipelines can be executed to take any action required thereby at Step 222.

Steps 224 to 232 show an exemplary module or pipeline according to one aspect of the present disclosure, while Steps 236 to 248 show a module pipeline or combination of module pipelines according to another aspect of this disclosure, which module pipelines 224-232 and 236-248 can be developed, set, and/or executed by different entities. As shown in FIG. 5B, for the module pipeline 224-232, for example, at Step 224 the security data can be normalized for use in models, applications, or other analytics. Then, at Step 226, the models can be applied, e.g., models including machine learning, probabilistic modeling, artificial intelligence, etc., to the normalized security data to detect or identify security threats and/or malicious or suspicious actions indicated thereby.

If a security threat and/or malicious or suspicious action is detected/identified, an action may be taken, for example, alarm or notice that a security threat or malicious action was detected/identified may be generated and/or action may be taken, for example, an action outside the platform to initiate remedial measures (Step 230). If no security threat is detected, no action may be taken (Step 232), though with some embodiments of the present disclosure, some action might still be taken, e.g., generation of an alarm or notice that no threat action was detected.

After either of Steps 230 and 232, the platform can generate new/updated security data based on the executions of the module or the module pipeline, e.g., providing analytics or other information based on the execution of the modules (Step 243). For example, the data can be provided or accessed by the broker (e.g., at Step 235) for subsequent execution of module/module pipelines. This updated/new data will not be accessible, however, if such access (or execution of the subsequent modules/module pipelines) would violate developed or set data parameters or policies (e.g., set/developed at Step 206) or other polices/parameters/metrics (e.g., set/developed/generated at Steps 208-212).

In the exemplary module pipeline indicated by Steps 236 to 248, access or sharing of security data between like actors, partners, information sharing communities, MS SPs, etc. may be requested at Step 236. For example, entities (e.g., the actors, partners, entities in the communities, MSSP) may attempt to execute one or more modules to process the shared data and any other data they may have. The platform broker then will determine whether access to the security data is to be permitted based on set data parameters (at Step 238). The platform broker generally also will determine whether any other modules, execution or infrastructure policies or parameters and/or historical module execution metrics are violated by execution of any module or module pipeline. If the data policies or parameters are violated (or any other policies, parameters or metrics are violated), the platform broker will not execute the modules or module pipeline and may generate a notification or alarm with feedback (Step 240). If no policies are violated, however, the platform broker may execute the modules or module pipelines to apply models, e.g., including machine learning, statistical analysis, probabilistic modeling, etc., to detect threats/malicious actions (Step 242). If a security threat and/or malicious action is detected at Step 244, an action may be taken (in Step 246), for example, an action to generate an alarm or notice that a security threat or malicious action was detected and/or to initiate remedial measures. If no security threat is detected at Step 244, no action can be taken (Step 248), though the platform can generate an alarm or notice that no threat or action was detected. Again, after Steps 246 and 248, the platform may generate new/updated security data based on the execution of these modules or module pipelines (Step 234). The new/updated security data may be provided to or accessed for use in later execution of modules/module pipelines (at Step 235). For subsequent executions of modules or module pipelines with the platform, the platform brokers will not execute a module or module pipeline if access to the new or updated data violates a developed set or initiated data parameters or policies, e.g., if the new or updated data includes information that is not sharable according to a data policy/parameter.

Figure 6:
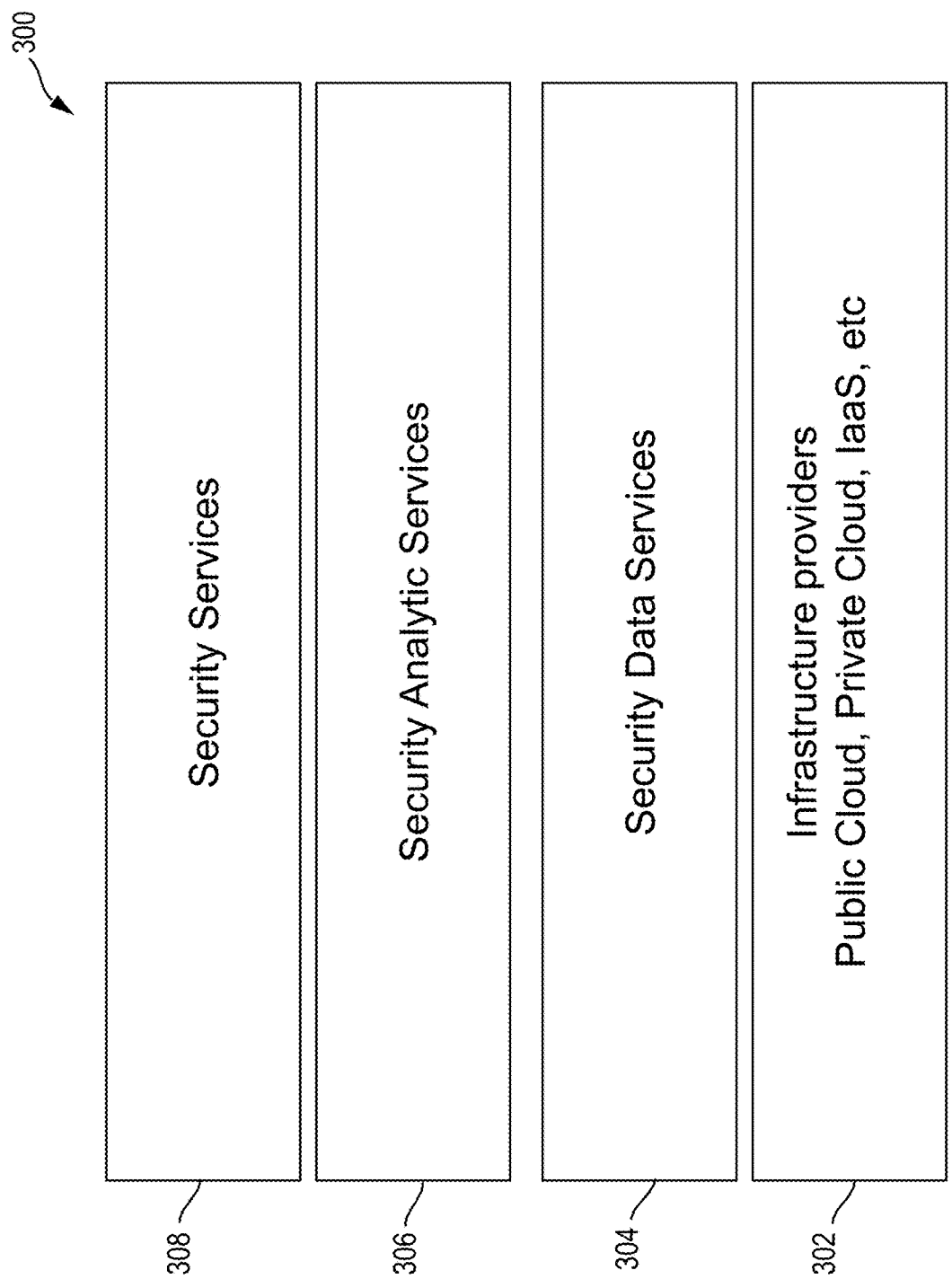
FIG. 6 shows a schematic diagram of the platform architecture according to principles of the present disclosure.

As generally shown in FIG. 6, the platform architecture 300 is comprised of a plurality of ordered layers, e.g., four ordered layers. In one example, the platform architecture 300 can include an infrastructure layer 302, which may be implemented physically (i.e., on premise, on site, e.g., at a site managed by a data controllers, third party technology partners, MSSPs, etc.), in a public IaaS cloud type service, or any other suitable implementation. The platform is agnostic to the particular implementation details of infrastructure provider, but requires certain technical properties (e.g., i/o performance, bandwidth, available compute and storage resources), and in some instances certain non-technical properties (e.g., geographic location, data controllership policies, data classification), in order to properly coordinate the scheduled execution of modules.

Additionally, as further shown in FIG. 6, a federated, globally accessible data services layer 304 can be built on top of the infrastructure layer 302, and can be operable to facilitate controlled, structured access to data accepted into the platform. The data services layer 304 may allow for referential data to be efficiently recalled for any given object. Modules may act upon initial raw data being accepted into the data services layer, data already persisted via the data services layer, the output of another module, and/or data private to that specific module instance (e.g., static data contained within the module or external data accessed via the module, a web API, etc.). Modules may produce information that at least in some manner enriches the current understanding of existing data (i.e., enrichment, tagging, attributes) in which case the new information can specifically reference to the associated existing data. Modules further may create a linkage between two or more existing datum, which results in a relationship between these data. Data written via the data services layer 304 is persisted and replicated according to policy. Even so, in general, data written via the data services layer 304 may be immutable except when purged due to retention policy, for example, accessed data may remain in situ, e.g., stored at a data controller's site, even if not allowed to be accessed by the platform due to a set/developed data policy or parameters. The data services layer 304 further provides mediated, granular access control to data or filtered/selected portions thereof. The data services layer 304 further can facilitate module access, according to policies/parameters, across data controllers allowing module instantiators to realize value in data originating from more than one source.

FIG. 6 additionally shows that the platform architecture 300 may include a security analytics layer 306 and a security services layer 308. Modules in the security analytics layer 306 and security services layer 308 may read and write data using the data services layers (304). Modules in the security services layers 308 may make use of analytic resources made available from the analytics layer 306. For example, the analytics layer 306 may make general statistical analysis available, but also provide a native capability to obtain feedback on processed data (e.g., human-in-the-loop feedback, automated classification processes, etc.), the results of which are stored via the data services 304. Within the set policies, the security analytics layer also can aggregate and synthesize like data sets across many data controllers, making composite data readily available to modules. Modules at the security services layer may provide analytics to detect and predict attacks. For example, a module pipeline can predict and displays the attacks that are likely to happen in the next 24 hours, or a sequence of events representing a detected threat tactic, or ability to respond, or remediate by issuing a command from the platform to a control on a platform participant's environment.

A module 52 generally is a self-contained description of compute operation. Modules 52 typically will have ingress and egress APIs as well as descriptive metadata about the module (i.e., priority, production aspects, geographic limitations, SLA). Modules 52 may operate in an event-driven or stream-based paradigm, or operate entirely upon historical data (i.e., batch). Modules generally are "horizontally scalable" unless defined otherwise. According to policy, modules may accept ingress external data (i.e., listening network sockets), and/or initiate egress network connections to access external resources or to export data from the platform. The module APIs are comprised of data schema designed to interpret data stored via data services. The schema can be built from primitives (e.g., integer, string, float, boolean), and higher order representations built from primitives (e.g., a 'domain' might be built from a string, a 'DNS resolution" might be a domain, an IP address, and a timestamp). Much like modules, the authors and publishers of the schema may vary substantially. Schemas persist and the lifespan of a schema generally does not depend on the lifetime of a module (i.e., module publication times and instantiate do not affect the availability of a schema). Modules that are combined into a module pipeline may "pass through" data that is not precisely specified in an ingress API (such data may be utilized by a later "downstream" module). The platform further can have versioning as a native capability to handle multiple versions of modules and data schema.

In addition to encouraging a modular design, modules may afford flexibility in deployment of complex module pipelines as well as development processes, e.g., wide variation in authors, publishers and users of modules. Modules also can be composable into larger module pipelines based on these ingress and egress data APIs. The scheduling of module execution is based on constraints explicitly set upon data, infrastructure and modules as well as metrics implicitly gathered by the platform based on configuration and historical performance. In some cases, a scheduling solution may be unsatisfiable resulting in a scheduling exception 66 rather than the scheduling of a module for execution. The composition of a single module pipeline might include modules from different publishers, executing via different infrastructure providers, and operating upon data owned by different owners. In the event that the logical operation of a module pipeline relies upon output dependencies from more than one module, the execution may specify synchronization points where some modules are not scheduled until others have completed.

Figure 7:
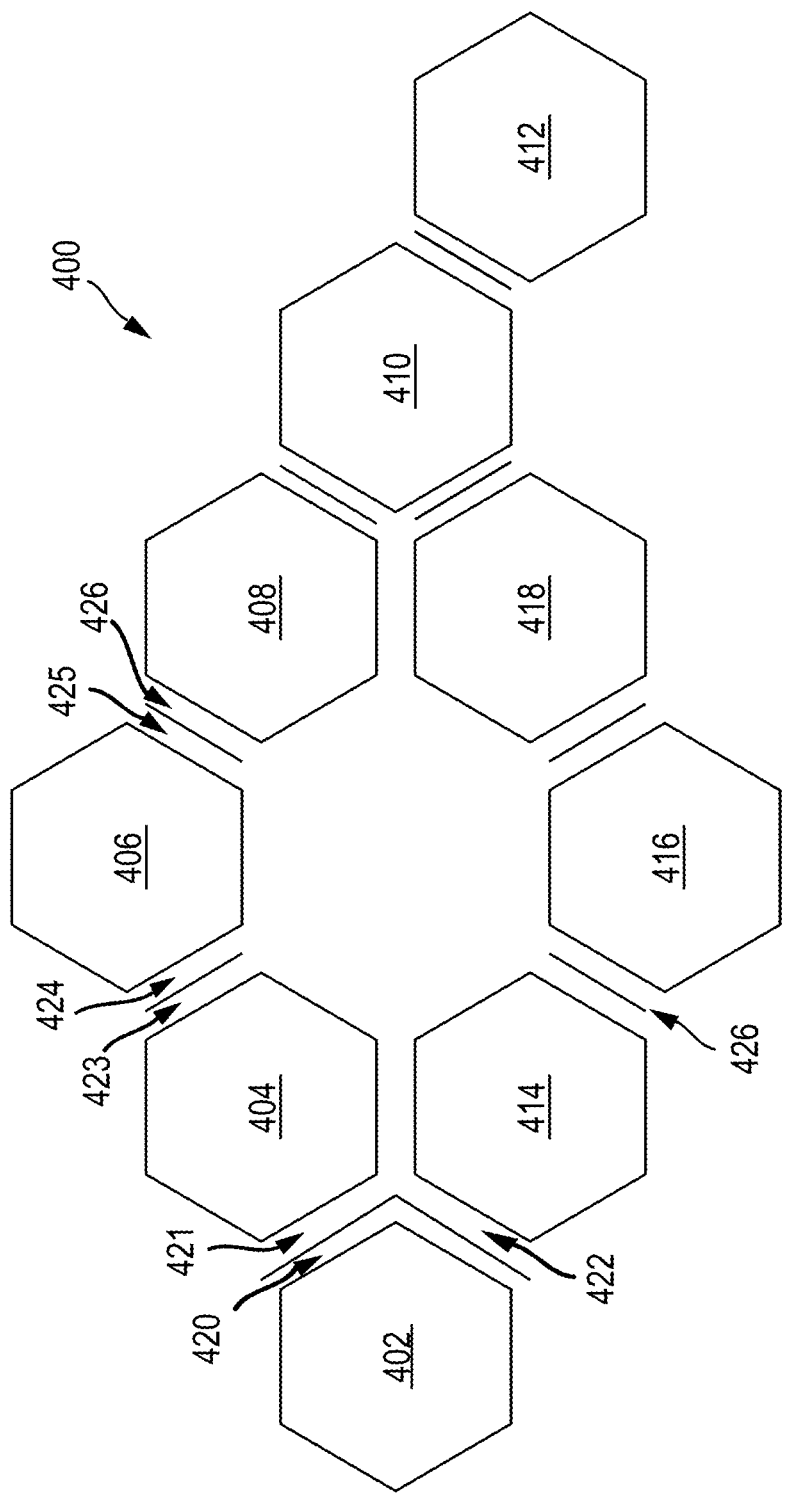
FIG. 7 shows a schematic diagram of an additional example module pipeline developed with the platform of the present disclosure.

FIG. 7 shows an additional exemplary module pipeline 400, wherein modules 402-412 are developed/generated by one entity, and modules 414-418 are developed/generate by a separate, distinct entity. This module pipeline can be used by the separate entities to share security data and/or analytics to detect security threats or malicious actions, and the modules can include modules for sharing access to data, normalizing data, interpreting the data, e.g., using high order analytics or probabilistic modeling, and deciding and taking actions upon detection of security threats or malicious actions.

As shown in FIG. 7, the egress API (420) of module 402 is compatible with the ingress API (421/422) of modules 404 and 414. The egress API (423) of module 404 is compatible with the ingress API (424) of module 406; the egress API (425) of module 406 is compatible with the ingress API (426) of module 408, and so on. In general, the two series of chained modules are executed independently. That is, the execution order of modules 402, 404, 406, and 408 depend upon each one another, as does the order of modules 414, 416, and 418. The execution of module 416 and 406, however, do not depend upon each other. Module 410 may require that modules 408 and 418 have both completed in order to execute. In one example, a constraint, e.g., a module policy or parameter, can be applied upon modules 414 is that it may only execute at one particular module location, that is the module is not permitted to be executed by any other infrastructure provider. Module 416 may have no constraint on execution location, but is configured to operate upon large sets of data in a different location than module 414. Interface 426, in the worst case, requires communicating a large amount of data between 414 and 416; however, historical metrics indicate that the two sites have a high bandwidth connection and, in the general case, interface 426 typically does not communication of large amounts of data. In this situation, modules 414 and 416 might be automatically scheduled to execute in different physical locations and/or infrastructure providers, with interface 426 traversing an inter-infrastructure provider network link. Variations of this example module pipeline include but are not limited to situations where data originates from within the platform (i.e., the data source is not external), and actions that do not actuate externally.

Accordingly, with embodiments of the present disclosure, several benefits and/or advantages can be realized. For example, the platform can facilitate constraint-based executions scheduling across diverse and disparate data, software, and infrastructure. Additionally, data controllers generally will be empowered to control data, e.g., retention, replication, accessibility, visibility, and physical location thereof. Module pipelines further can be assembled as discussed to form a wide range of composable modules created and published by a diverse set of entities to allow for the processing of security data between various entities. Modules further may access normally disparate, global data, e.g., that may be owned by many owners, to facilitate better data-driven analytics and the network effect. Still further, the platform according to the present application can allow for flexible deployment models, e.g., that can be constantly changed and/or updated based on data and analytics.

Figure 8A:
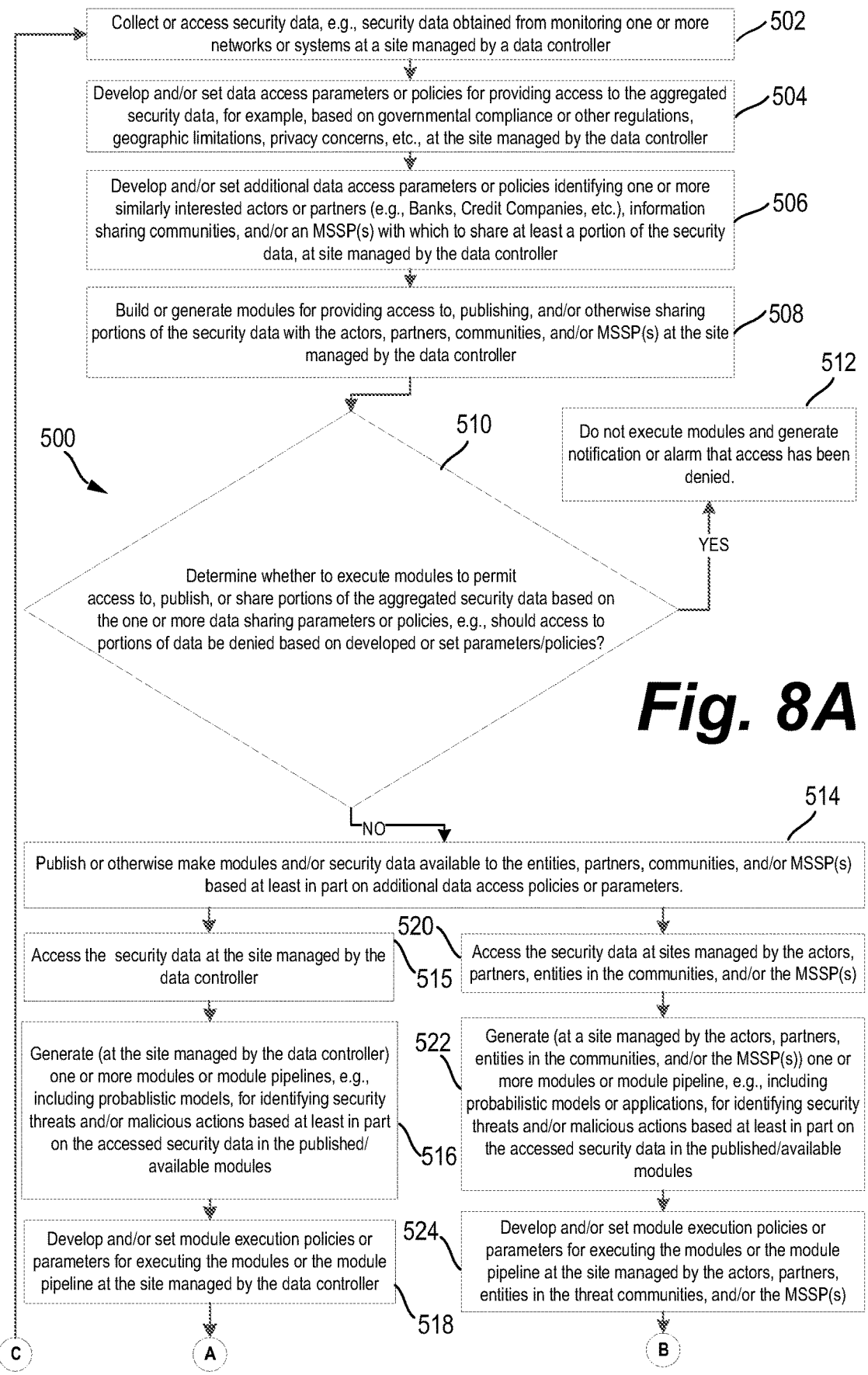
FIGS. 8A and 8B show a flow diagram illustrating a process or method for sharing, distributing, or accessing security data and/or security models, applications, or analytics according to another aspect of the present disclosure.
Figure 8B:
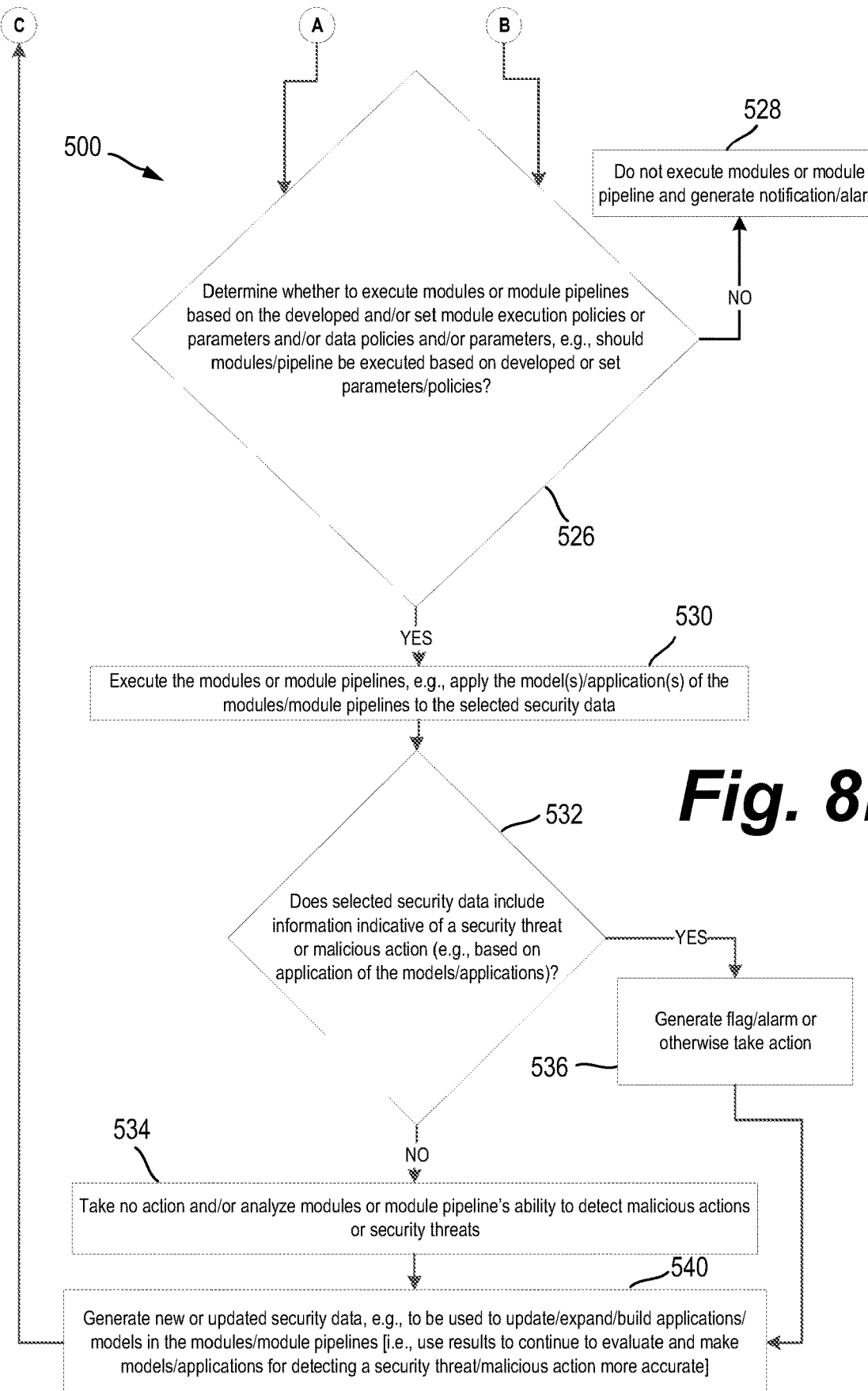

FIGS. 8A and 8B show a method or process 500 for sharing or monitoring security data and building threat monitoring applications according to yet another embodiment of the present application. As shown in FIG. 8A, the method or process may include collecting or accessing security data, for example, security data obtained from monitoring one or more networks or systems at a site managed by a data controller (at Step 502). The method further may allow for the development and/or setting of data access parameters or policies for providing access to the aggregated security data, for example, based on governmental compliance or other regulations, geographic limitations, privacy concerns, or other suitable considerations or concerns, for example, at the site managed by platform participants, e.g., data controllers (Step 504), and for the development or setting of additional data access parameters or policies to identify one or more similarly interested actors or partners (e.g., banks, credit card companies, etc.), information sharing communities and/or MS SPs with which to share at least a portion of the security data, for example, these parameters can be set at a site managed by the data controllers (Step 506).

At the Step 508, modules can be built or generated, for example, for providing access to, publishing, and/or otherwise sharing portions of security data with the like actors, partners, communities and/or MS SPs at the site managed by the data controllers. A determination then can be made as to whether to execute the modules to provide access to, publish, or share portions of the aggregated security data based on the one or more data sharing parameters or policies set/developed, for example, it will be determined whether access to portions of the data should be denied based on developed or set parameters or policies (Step 510). If such access violates set or developed parameters/policies, the modules will not be executed and notification or alarm or other feedback may be provided to indicate that access has been denied at Step 512. On the other hand, if policies are not violated, the modules and/or security data may be published or otherwise made available to the entities, partners, communities, and/or MSSPs based at least in part on additional data access policies or parameters (at Step 514).

As further shown in FIG. 8A, at a data controller's site, the data controllers may access the published/accessible security data (Step 515), and may generate one or more modules or module pipelines, e.g., including probabilistic models for identifying security threats and/or malicious actions based at least in part on the accessed security data in the published or available modules (Step 516). Further, the data controller may develop or set module execution policies or parameters for executing the modules or the module pipelines (at Step 518).

Additionally, the identified actors, partners, entities in the communities and/or the MSSP may also access the accessible/shared security data (Step 520). At Step 522, these actors, partner, entities, etc., further may generate one or more modules or module pipelines, e.g., including probabilistic models or applications, for identifying security threats and/or malicious actions based at least in part on the accessed security data in the published available modules. Further, the platform participants, actors, partners, entities in the communities and/or the MSSPs, can develop or set module execution policies or parameters for executing the modules or the module pipelines (Step 524).

FIG. 8B further shows that the data controllers, or the other platform participants, actors, partner, entities, MSSP, etc., then may execute or attempt to execute the developed module pipeline or modules to process the accessed or shared security data, and a determination will be made as to whether to execute the modules or module pipelines based on the developed or set module execution policies and/or parameters as well as other policies or parameters set in the platform (Step 526).

If any of the policies or parameters are violated, the modules or module pipelines will not be executed and an alarm or notification will be generated to indicate a failure to execute (at Step 528). But, if the policies or parameters are not violated, the modules or module pipelines will be executed and the models or applications of the modules or module pipelines will be applied to the shared or accessed security data (Step 530). For example, modules/applications, e.g., models or applications employing machine learning, probabilistic analysis, etc., may determine whether the access/shared security data includes information indicative of a security threat or malicious action (Step 532).

If no security threat has been detected, no action may be taken and/or the modules or module pipelines can be analyzed to determine their ability to detect malicious actions or security threats (Step 534). If a security threat is detected, however, a flag or alarm might be generated to indicate a detected security threat or malicious action and/or action can be taken, e.g., specific remediation measures can be taken (Step 536). After each of Steps 534 and 536, the method may include generating new or updated security data, e.g., based on application of the models to the accessed security data, to be used to update, expand, build applications, models in the modules, module pipelines, for example, to continue to evaluate and make models/applications for detecting a security threat and malicious actions more accurately (Step 540). Such new/updated data may be provided to the data collected at Step 502 the method/process may be repeated.

Figure 9:
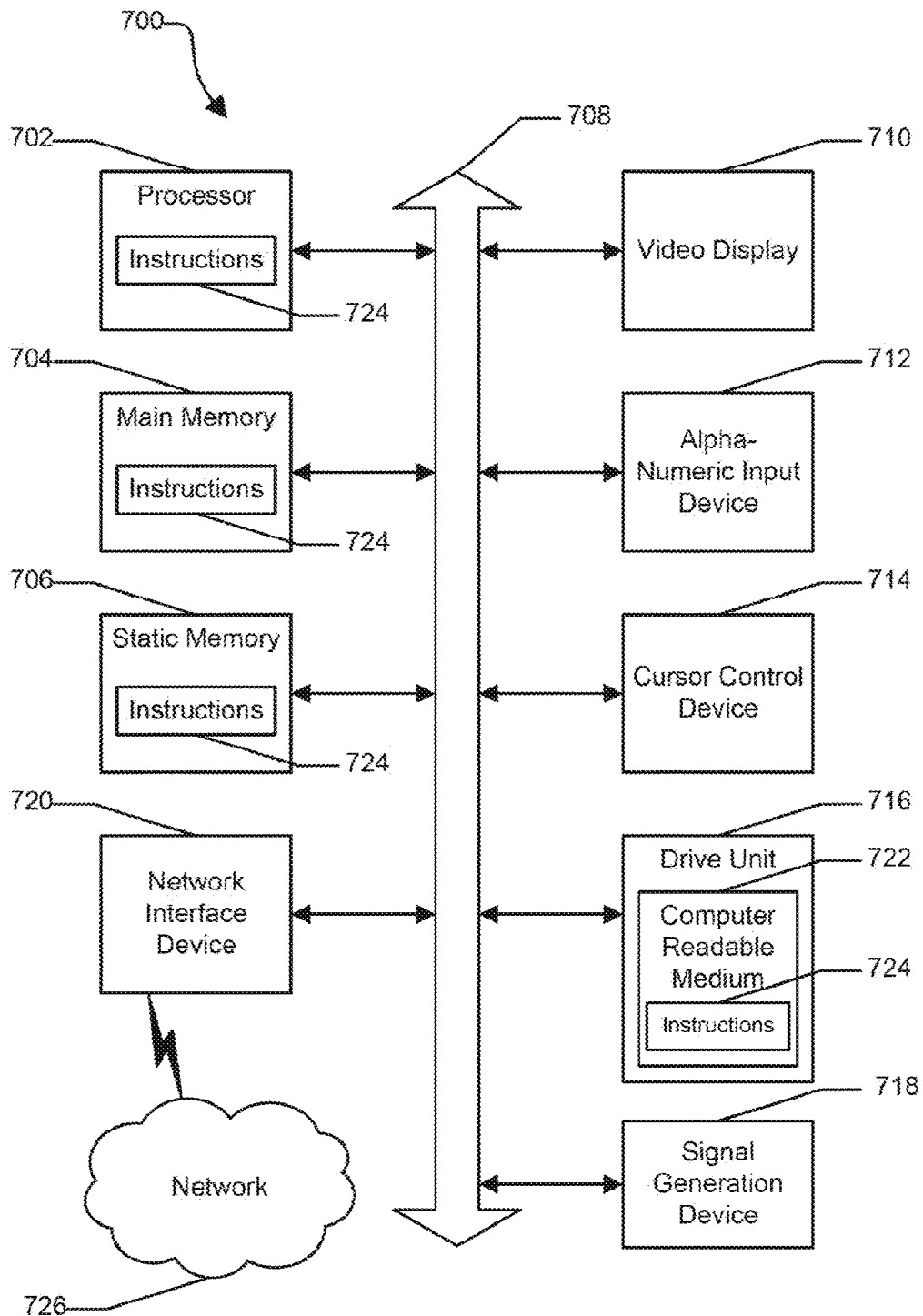
FIG. 9 is a block diagram illustrating an information handling system according to one example embodiment of the present disclosure.

FIG. 9 shows an example of an information handling system 700 capable of administering each of the specific embodiments of the present disclosure and variations thereof. As noted, the platform disclosed herein is configured to be device/hardware agnostic. Thus, the platform can operate across a variety of information handling systems.

The information handling system 700 can represent the user information handling systems 32 and 42 of FIG. 2. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touch-screen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, any means-plus-function clauses are intended to cover the structures described herein as performing the recited function and not only structural equivalents, but also equivalent structures.

What is claimed is:

1. A method of developing and distributing applications and data for building security applications, comprising:
    determining and setting a plurality of data policies for access and/or filtering of security data based on selected parameters;
    selecting a plurality of modules for processing the security data, the plurality of modules including one or more modules operable to apply one or more predictive security applications or models to the security data for detection or identification of security threats, malicious, or suspicious activity;
    one or more modules operable to take one or more preventative or remedial actions based on detected or identified security threats, malicious, or suspicious activity; and one or more modules for providing access to the security data with like actors or sharing partners;
    setting one or more module execution policies governing execution of the plurality of modules, the one or more module execution policies including at least one policy for normalizing the security data; creating, updating and/or modifying of the one or more predictive applications or models, used for processing the security data; for detecting the security threats, malicious, or suspicious activity; for taking remediation measures for the detected or identified security threats, malicious, or suspicious activity; for providing access to the security data; and for determining what resources are available to execute the one or more modules;
    receiving a request to initiate execution of the selected plurality of modules to access and process a selected portion or filtered set of the security data;
    determining if the request violates one or more of the data policies or one or more of the module execution policies applicable for processing the selected portion or filtered set of the security data;
    if one or more of the data policies or the one or more module execution policies are violated, blocking execution of the selected plurality of modules as requested; and
    if the data policies or the module execution policies are not violated, executing the selected plurality of modules to process the selected portion or filtered set of the security data;
    wherein, execution of the plurality modules comprises applying the one or more predictive security applications or models to the selected portion or filtered set of the security data to identify a security threat and/or malicious or suspicious activity and providing access to at least a portion of the security data with the like actors or sharing partners.

2. The method of claim 1, further comprising filtering the security data to remove selected proprietary or sensitive data.

3. The method of claim 1, wherein the plurality of modules further includes one or more modules operable for normalizing the accessed selected portion or filtered set security data by structuring the security data to enable access to and processing of the security data by the one or more predictive applications or models.

4. The method of claim 1, wherein the one or more predictive security applications or models comprises artificial intelligence, neural networks, machine learning, statistical analysis, probabilistic modeling, named entity recognition, or combinations thereof.

5. The method of claim 1, further comprising:
    generating one or more historical metrics based in part on application of the data policies and/or the module execution policies.

6. The method of claim 1, further comprising:
    setting one or more infrastructure policies that determine a time, a location, and/or resources to be used for execution of the plurality of modules; and
    if the one or more infrastructure policies are violated, blocking execution of the plurality of modules as requested.

7. The method of claim 1, further comprising:
    generating historical metrics that capture previously developed data policies, module policies, and infrastructure policies; and
    if one or more of the historical metric are violated, blocking execution of the plurality of modules as requested, even if the data policies, the module policies, or the infrastructure policies are not violated.

8. The method of claim 1, wherein the plurality of modules includes a pipeline of modules with sets of selectable modules that are executed according to a prescribed sequence.

9. A system of developing and distributing applications and data for building security applications, comprising:
    a plurality of data storage centers;

at least one processor including a platform broker that applies a plurality of data policies for accessing and filtering security data at one or more of the data storage centers, and is operable to execute a plurality of analytical modules for processing the security data, the plurality of analytical modules including one or more modules operable to apply one or more security applications or predictive models for detection or identification of security threats, and one or more modules operable to take remediation actions based on detected or identified security threats wherein the platform broker is configured to:
- a. receive a request to initiate execution of a selected analytical module or set of analytical modules of the plurality of analytical modules to access at least a selected portion or filtered set of the security data;
- b. apply applicable data policies to the accessed security data and execute the selected analytical module or set of analytical modules to process the security data if access and application of the selected analytical module or set of analytical modules to the accessed security data does not violate one or more of the plurality of data policies; and
- c. repeat steps a. and b. for each request to initiate execution selected analytical modules or sets of analytical modules of the plurality of modules;

wherein, upon execution of the plurality of analytical modules, the plurality of analytical modules applies the one or more security applications or predictive models to the security data to predict or determine if a security threat is found and applies one or more remediation actions to address the security threat; and wherein the processor is operable to generate new or updated security data upon execution of the selected analytical modules or sets of analytical modules.

10. The system of claim 9, wherein the platform broker is configured to be operable using a variety of differing hardware, infrastructure systems, and operating software.

11. The system of claim 9, wherein the security applications or predictive models comprise artificial intelligence, neural networks, machine learning, probabilistic modeling, named entity recognition, or combinations thereof.

12. The system of claim 9, wherein the platform broker is cloud-based and is configured to access the plurality of data storage centers.

13. The system of claim 9, wherein the platform broker further is configured to apply one or more applicable module execution policies and execute the selected analytical module or set of analytical modules to process the security data if execution of the selected analytical module or set of analytical modules does not violate one or more of the module execution policies.

14. The system of claim 9, wherein the platform broker further is configured to apply one or more set infrastructure policies that determine a time, a location, and/or resources to be used for execution of the plurality of modules, and block execution of the selected analytical module or set of analytical modules if one or more of the infrastructure policies are violated.

15. A method, comprising:
obtaining security data from one or more data producers;
setting one or more data policies for determining access to and filtering of the security data;
selecting a module pipeline including plurality of modules configured to be executed in a prescribed sequence to process the security data, the plurality of modules including one or more modules operable to normalize or structure at least a portion of the security data; one or more modules operable to apply one or more predictive security models or applications to the at least a portion of the security data for detection or identification of one or more security threats; and one or more modules operable to decide a specific action to be taken to mitigate or eliminate one or more identified or detected security threats;
setting one or more module policies for the plurality of modules, the one or more module policies including at least one policy for normalizing or structuring the security data; at least one policy for creating, updating or modifying the one or more predictive security models or applications; and at least one policy for actions taken for detected or identified security threats;
setting one or more infrastructure policies that determine a time, a location, or resources to be used for execution of the plurality of modules;
if execution of one or more of the plurality of modules violates at least one of the one or more data policies, the one or more module policies, or the one or more infrastructure policies, blocking execution of each of the plurality of modules; and
if execution of one or more of the plurality of modules does not violate the one or more data policies, the one or more module policies, or the one more infrastructure policies, executing the plurality of modules according to the prescribed sequence of the selected module pipeline.

16. The method of claim 15, wherein execution of the plurality modules includes
normalizing or structuring a filtered portion of the security data to generate normalized or structured security data, the filtered portion of the security data obtained based on at least one of the one or more data policies;
applying the one or more predictive security models or applications to the filtered portion of the security data for detection or identification of a security threat; and
determining a specific action to be taken to mitigate or eliminate the security threat.

17. The method of claim 15, wherein the predictive security models or applications comprise artificial intelligence, neural networks, machine learning, probabilistic modeling, named entity recognition, or combinations thereof.

18. The method of claim 15, further comprising:
generating historical metrics that capture previously developed data policies, module policies, and infrastructure policies; and
if one or more of the historical metric are violated, blocking execution of the plurality of modules as requested, even if the data policies, the module policies, or the infrastructure policies are not violated.

* * * * *